(12) United States Patent
Gandolfo

(10) Patent No.: US 11,068,688 B2
(45) Date of Patent: Jul. 20, 2021

(54) MULTI-FUNCTION ULTRASONIC SENSOR CONTROLLER WITH FINGERPRINT SENSING, HAPTIC FEEDBACK, MOVEMENT RECOGNITION, 3D POSITIONING AND REMOTE POWER TRANSFER CAPABILITIES

(71) Applicant: Pierre T. Gandolfo, Le Cannet (FR)

(72) Inventor: Pierre T. Gandolfo, Le Cannet (FR)

( * ) Notice: Subject to any disclaimer, the term of this patent is extended or adjusted under 35 U.S.C. 154(b) by 227 days.

(21) Appl. No.: 16/397,105

(22) Filed: Apr. 29, 2019

(65) Prior Publication Data

US 2020/0218867 A1 Jul. 9, 2020

Related U.S. Application Data

(60) Provisional application No. 62/788,212, filed on Jan. 4, 2019.

(51) Int. Cl.
*G06K 9/00* (2006.01)
*G06F 3/01* (2006.01)
(Continued)

(52) U.S. Cl.
CPC ............ *G06K 9/0002* (2013.01); *G01S 15/46* (2013.01); *G01S 15/8915* (2013.01);
(Continued)

(58) Field of Classification Search
CPC .. G06K 9/0002; G06K 9/00026; G06K 9/522; G06F 3/016; G06F 3/04883; G06F 3/0436; G06F 21/32; G01S 15/8993; G01S 15/8915; G01S 15/46; G01S 2015/465; G01S 7/52084; G01S 15/8925
See application file for complete search history.

(56) References Cited

U.S. PATENT DOCUMENTS

2015/0002477 A1* 1/2015 Cheatham, III .... G06F 3/04886 345/177
2016/0328985 A1* 11/2016 Endo ..................... G06F 3/0412
(Continued)

*Primary Examiner* — Premal R Patel

(57) ABSTRACT

The present invention is a multi-function ultrasonic sensor controller (inc. sensor driver capabilities) capable of authenticating an end-user when placing his/her finger on any am of a device display while further providing haptic feedback, surface roughness and texture rendering, proximity sensing, movement recognition, 3D positioning and remote power transfer for an improved end-user experience. By default, the multi-function ultrasonic sensor controller of the invention is made of a first set of ultrasonic transducers covering the whole screen display area for fingerprint scanning, a second set ultrasonic transducers for haptic feedback, surface and texture roughness rendering, a third set ultrasonic transducers for movement recognition, proximity sensing and 3D localization, and a fourth set of ultrasonic transducers for the reception of remote power transfer through ultrasound waves. The multi-function ultrasonic sensor controller according to the invention is particularly well-suited for smartphones but can also be applied to other application markets and end-user devices having the need to jointly support end-user authentication with flexible finger placement along aforementioned additional functionalities.

2 Claims, 7 Drawing Sheets

(51) Int. Cl.
  *G06F 3/0488* (2013.01)
  *G01S 15/89* (2006.01)
  *G01S 15/46* (2006.01)

(52) U.S. Cl.
  CPC .......... *G01S 15/8993* (2013.01); *G06F 3/016* (2013.01); *G06F 3/04883* (2013.01); *G06K 9/00026* (2013.01); *G01S 2015/465* (2013.01)

(56) References Cited

U.S. PATENT DOCUMENTS

| | | | |
|---|---|---|---|
| 2017/0090576 A1* | 3/2017 | Peterson | G06F 3/016 |
| 2017/0324891 A1* | 11/2017 | Mark | G06F 3/0304 |
| 2018/0046281 A1* | 2/2018 | Pi | G06K 9/0004 |
| 2018/0246574 A1* | 8/2018 | Modarres | G06F 3/0416 |
| 2018/0247143 A1* | 8/2018 | Cho | G06K 9/0004 |
| 2018/0284892 A1* | 10/2018 | Kwon | G06F 3/016 |
| 2018/0321787 A1* | 11/2018 | Khoshkava | G06F 3/017 |
| 2019/0187244 A1* | 6/2019 | Riccardi | G01C 21/165 |
| 2019/0205596 A1* | 7/2019 | Kim | B06B 1/0692 |
| 2019/0235656 A1* | 8/2019 | Khajeh | G06F 3/0416 |
| 2019/0346969 A1* | 11/2019 | Yip | G06F 3/0412 |
| 2020/0012319 A1* | 1/2020 | Kobrin | G09F 25/00 |
| 2020/0073103 A1* | 3/2020 | Wang | G02B 21/0036 |
| 2020/0134279 A1* | 4/2020 | Hansen | G06K 9/209 |
| 2020/0147643 A1* | 5/2020 | Sammoura | G06F 1/3262 |
| 2020/0160018 A1* | 5/2020 | Panchawagh | H01L 41/0825 |
| 2020/0171372 A1* | 6/2020 | Fisher | A63B 71/0605 |
| 2020/0184176 A1* | 6/2020 | Liu | G06K 9/0002 |
| 2020/0201461 A1* | 6/2020 | Miyamoto | H01L 41/09 |

* cited by examiner

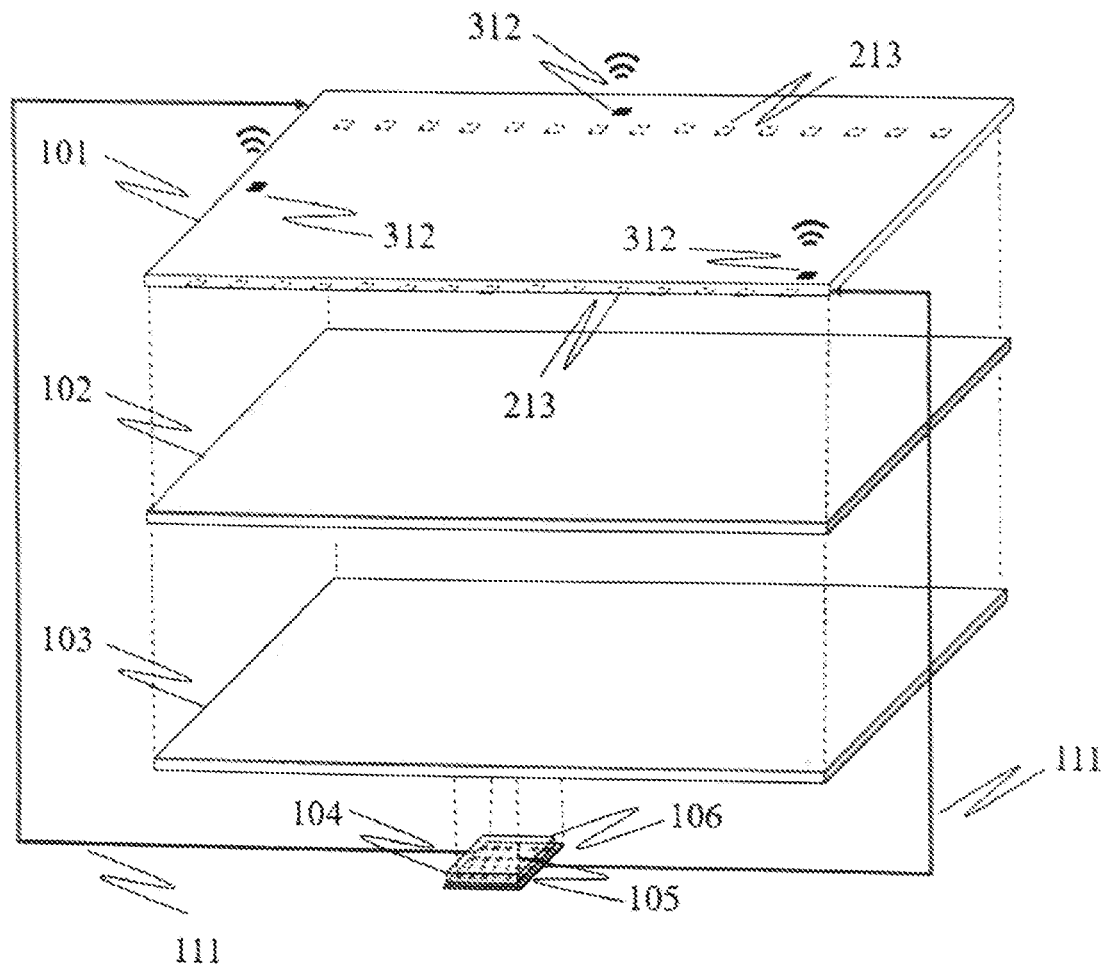
FIG. 4a (Front Page View)

US 11,068,688 B2

MULTI-FUNCTION ULTRASONIC SENSOR CONTROLLER WITH FINGERPRINT SENSING, HAPTIC FEEDBACK, MOVEMENT RECOGNITION, 3D POSITIONING AND REMOTE POWER TRANSFER CAPABILITIES

CROSS-REFERENCE TO RELATED APPLICATIONS

The present document claims the benefits (i.e. provisional application for patent) of the earlier filing date of patent application No. 62/788,212 (confirmation number 5542, EFS ID 34760993) filled on Jan. 4, 2019, and entitled "Multi-function ultrasonic fingerprint sensor controller with haptic feedback and gesture recognition", the contents of which are incorporated by reference.

STATEMENT REGARDING FEDERALLY SPONSORED RESEARCH OR DEVELOPMENT

Non-applicable

REFERENCE TO SEQUENCE LISTING, A TABLE, OR A COMPUTER PROGRAM LISTING COMPACT DISC APPENDIX

Non-applicable.

BACKGROUND OF THE INVENTION

The present invention relates to a multi-function ultrasonic sensor controller (inc. sensor driver capabilities) capable of authenticating an end-user when placing his/her finger on any area of a display (e.g. smartphone, smartwatch) while further providing haptic feedback, surface roughness and texture rendering, proximity sensing, movement recognition, 3D positioning and remote power transfer.

As illustrated by FIG. 1a, an ultrasonic fingerprint sensor (104) is made of multiple ultrasonic transducers (piezoelectric- or capacitive-based), typically arranged in a 2D array configuration (105) with a given pitch solution. When excited, the aforementioned ultrasonic transducers (105) generate an acoustic plane wave that first propagates trough display panel (103), touch panel (102) and cover glass (101) before penetrating and reflecting from both the outer epidermal and inner dermal layers of the end-user finger (109). The returning ultrasonic echoes am then processed by those same transducers. The fingerprint image being detected from differences in the acoustic reflection arising from impedance mismatch between fingerprint ridge/valleys and the coupling medium—little reflection being obtained from ridges (human tissue medium) as opposed to large reflection from valleys (air medium). Consequently, a whole 3D image of the fingerprint's ridges, valleys and pores is then captured and that so even if the finger is wet or oily since liquids transmit sound waves well. As such, ultrasonic sensors are unaffected by most contaminants (e.g. oil, water).

The problem though with current ultrasonic fingerprint sensing methods, as well as alternative fingerprint sensing technologies (e.g. capacitive, optical) and other authentication methods (e.g. facial 3D recognition), is that they suffer from several limitations: lack flexibility (dedicated screen area/hot zone for fingerprint scanning or specific device position/orientation for face capture) and/or negatively affect the aesthetics aspect of the device (presence of a notch at the top of a phone display or touch button at the bottom, thus preventing the use of true-infinity display) or and/or enable only one use-case (i.e. user authentication).

The hereby multi-function ultrasonic sensor controller proposes to remove all above barriers to adoption by proposing an ultrasonic sensor controller with multi-function capabilities.

BRIEF SUMMARY OF THE INVENTION

Consistent with the tide of this section, only a brief description of selected features of the present invention is now presented. A more complete description of the present invention is the subject of this entire document.

The multi-function ultrasonic sensor controller according to the invention enable to suppress all aforementioned drawbacks. A feature of a multi-function ultrasonic sensor controller according to the invention is to scan the end-user fingerprint from any location on the display through either beam steering or polar-to-cartesian reflections conversion.

Another feature of the multi-function fingerprint sensor controller according to the invention is to provide the device end-user with haptic feedback and surface roughness/texture rendering through friction modulation.

Another feature of the multi-function ultrasonic sensor controller according to the invention is to provide the device end-user with movement recognition (e.g. gesture, respiration/breathing monitoring) and proximity sensing through time-of-flight and velocity measurements as well as 3D positioning through trilateration calculation.

In other embodiments of the present invention, the multi-function ultrasonic sensor controller according to the invention may further include one additional ultrasonic transducer for the reception of remote power transfer through ultrasound waves.

As such, the multi-function ultrasonic sensor controller according to the invention is particularly well-suited for smartphones but can also be applied to other application markets and end-user devices having the need to jointly support end-user authentication with flexible finger placement (infinity display) along aforementioned additional functionalities.

BRIEF DESCRIPTION OF THE SEVERAL VIEWS OF THE DRAWING

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

FIG. 4a shows, in a three-dimensional space, the joint implementation of ultrasonic transducers for fingerprint sensing, haptic feedback, movement recognition and 3D positioning all connected to the multi-function ultrasonic sensor controller according to the invention and where the phased array of ultrasonic transducers used for fingerprint scanning is centralised in one location.

DETAILED DESCRIPTION OF THE INVENTION

Figure 1A:
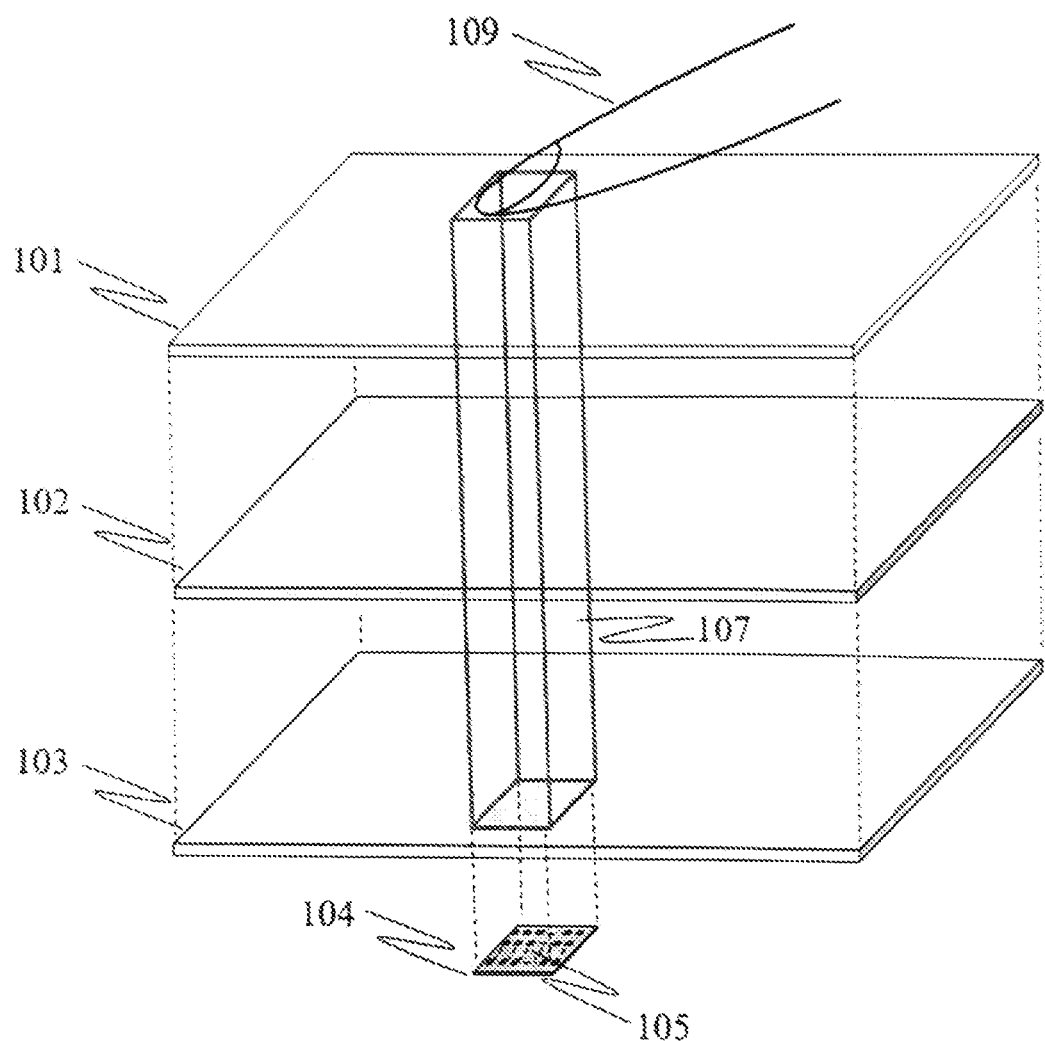
FIG. 1a shows, in a three-dimensional space, an end-user device (e.g. smartphone) made of several layers (display panel, touch panel, cover glass) with a conventional ultrasonic fingerprint sensor being placed underneath in order to scan the end-user fingerprint on top at a given and fixed location (e.g. hot zone)
Figure 1B:
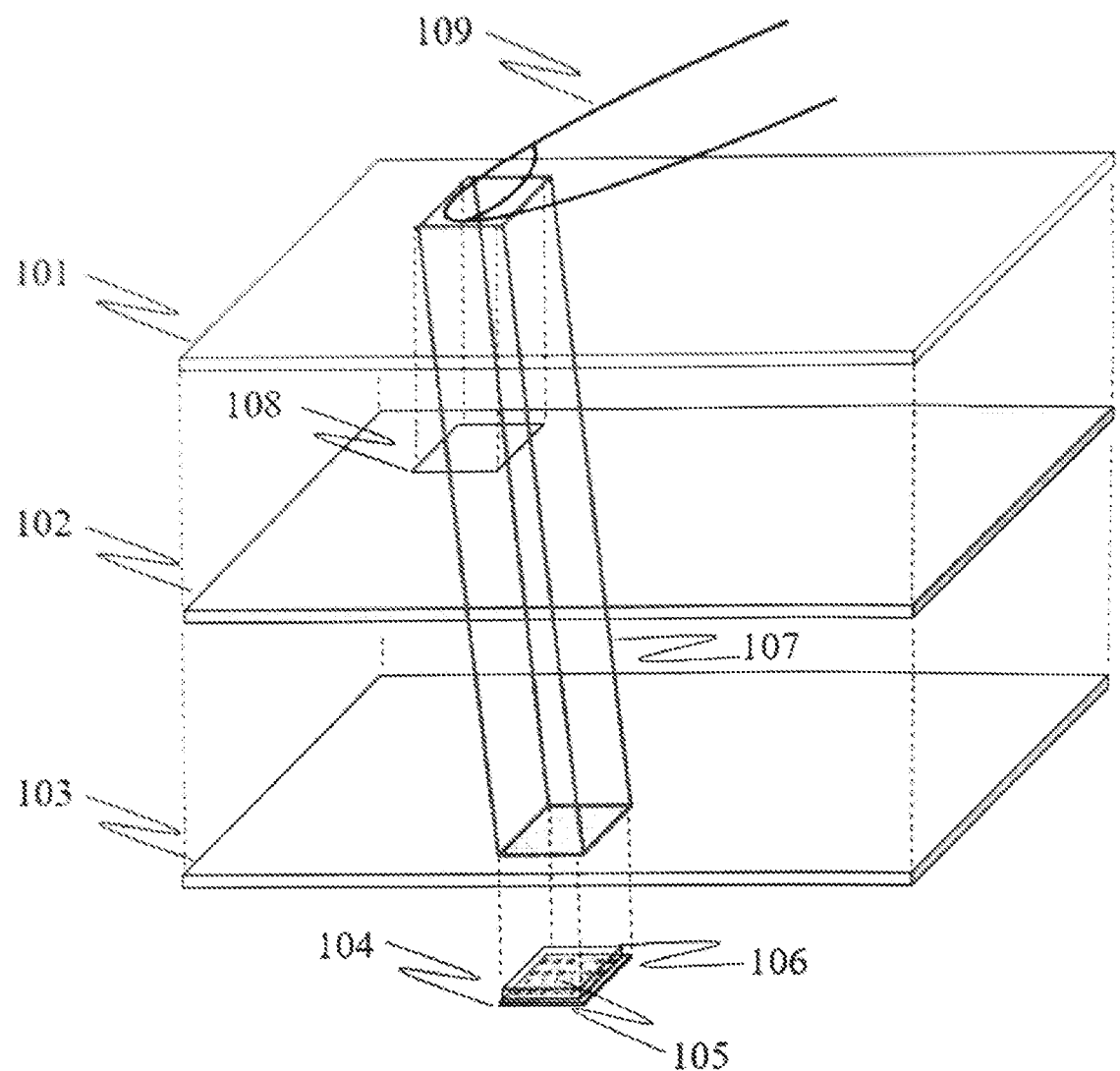
FIG. 1b illustrates, in a three-dimensional space, an embodiment of the multi-function ultrasonic sensor controller according to the invention with authentication-related ultrasonic transducers arranged in a phased array configuration.

Referring to those drawings and more specifically to FIG. 1b, the multi-function ultrasonic sensor controller (104) according to the invention comes equipped with a first set authentication-related ultrasonic transducers (105) arranged in a phased array configuration centralized at one location. By adjusting the relative phase delay of each transducer element, it is then possible to steer (107) the ultrasonic waveform in order to scan the end-user fingerprint from any location on the display. The scanning process can be fastened through the optional location feedback (108) from the touch panel (102) and the array of ultrasonic transducers is further glass-coupled (106) to the display panel (103) in order to improve the transmission coefficient and signal-to-noise ratio. The captured representation of the end-user fingerprint is then to be matched with the stored fingerprint template for user authentication.

Figure 1C:
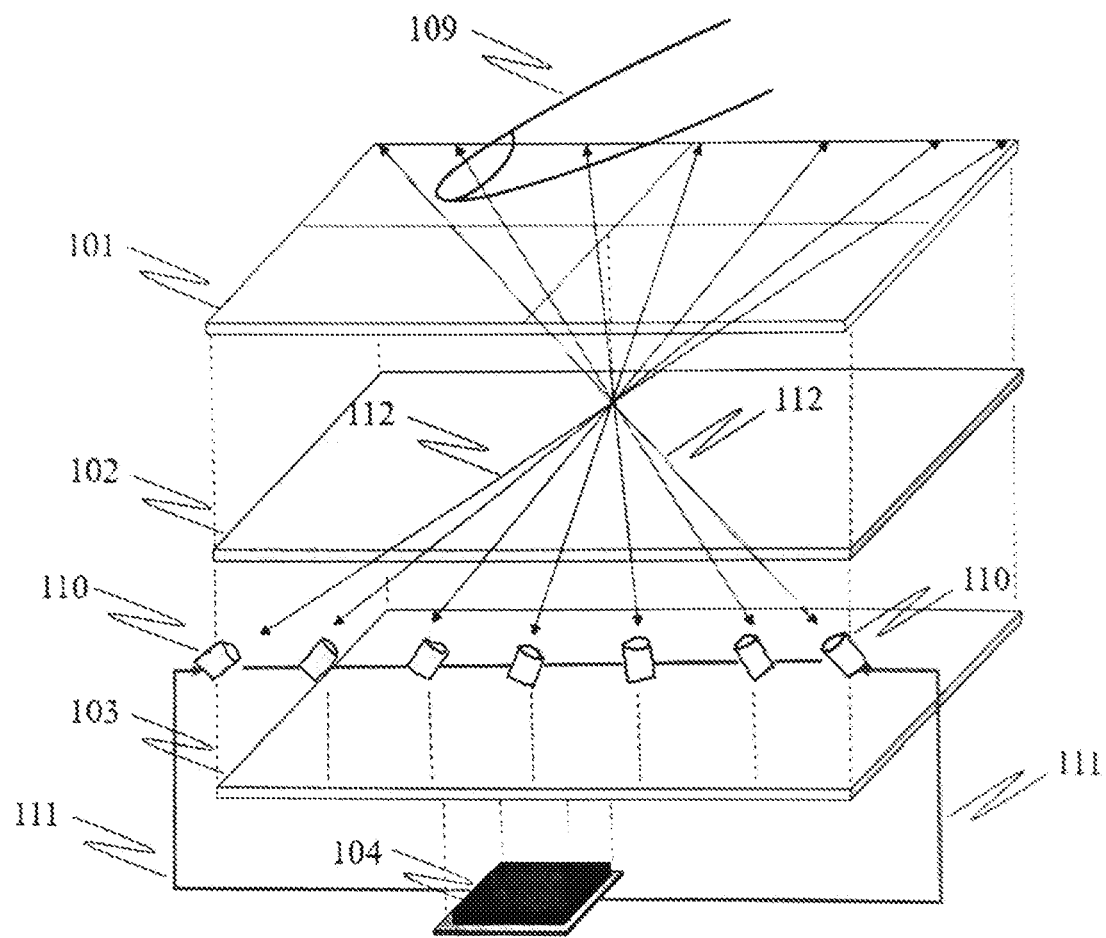
FIG. 1c shows, in a three-dimensional space, another embodiment of the multi-function ultrasonic sensor according to the invention with authentication-related ultrasonic transducers arranged in a linear configuration, each transducer pointing towards the display centre of the end-user device.

FIG. 1c shows an alternate embodiment of the present invention where the set of authentication-related ultrasonic transducers (110), connected (111) to the multi-function ultrasonic sensor controller (104), is arranged in a linear configuration with each transducer pointing towards (112) the display centre of the end-user device in order to cover the display area (101) from all possible angles and so scan the end-user fingerprint. The reflections captured by each transducer are first offset-compensated in order to emulate a circular configuration before being converted from polar to cartesian coordinates through inverse Fourier transform. This leads to a cartesian representation of the end-user fingerprint which is then to be matched with the stored fingerprint template for user authentication.

Figure 2:
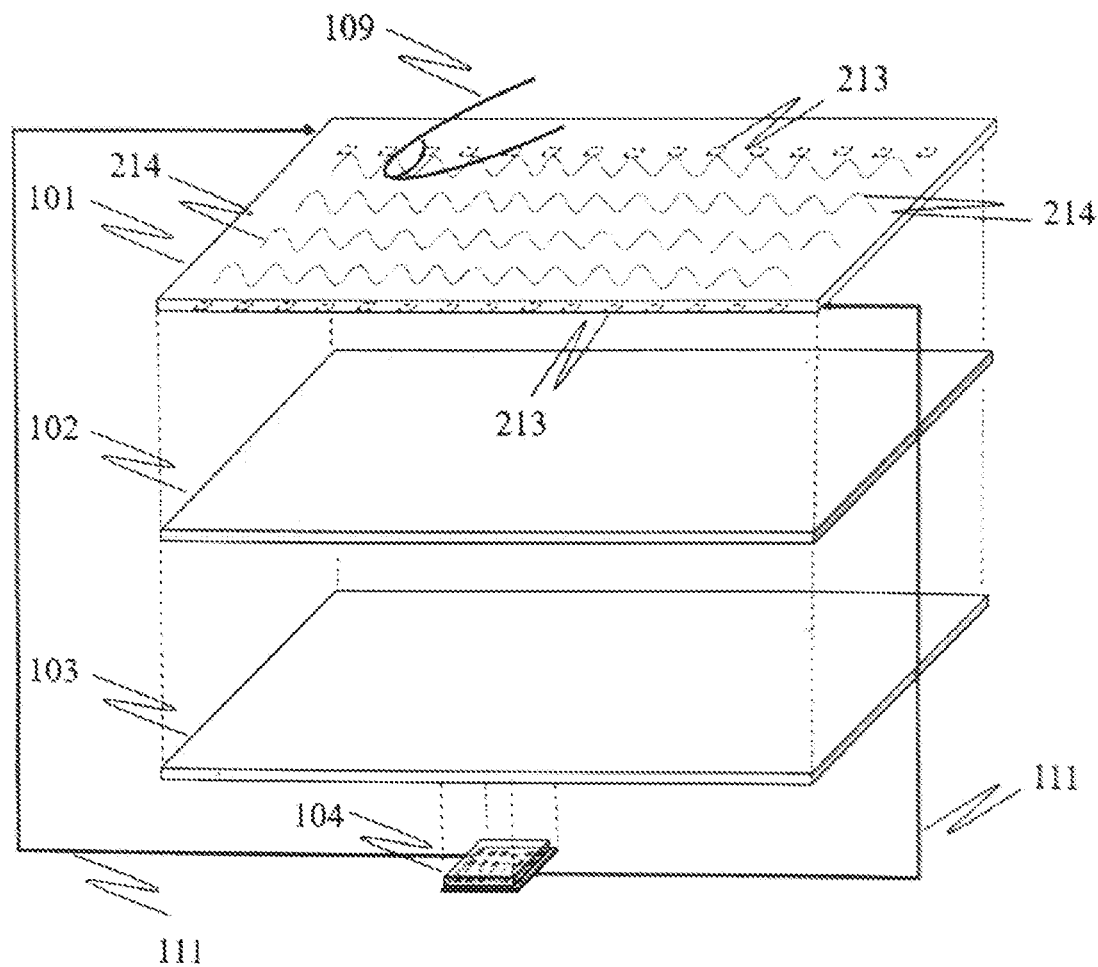
FIG. 2 illustrates, in a three-dimensional space, another embodiment of the multi-function ultrasonic sensor controller according to the invention with ultrasonic transducers placed under the cover glass of the end-user device along two of the four screen edges for haptic feedback (inc. surface roughness and texture rendering though friction modulation)

In the embodiment of the present invention shown in FIG. 2, the multi-function ultrasonic sensor controller (104) is connected (111) to a second set of ultrasonic transducers (213) placed under the cover glass (101) along two of the four screen edges in order to provide haptic feedback to the end-user. The transverse standing waves (214) created as a result are amplitude-modulated, thus conveying the surface roughness of a displayed image through friction modulation—higher vibration leading to lower friction. Different spatial frequency can further be used for the emulation of different textures.

Figure 3:
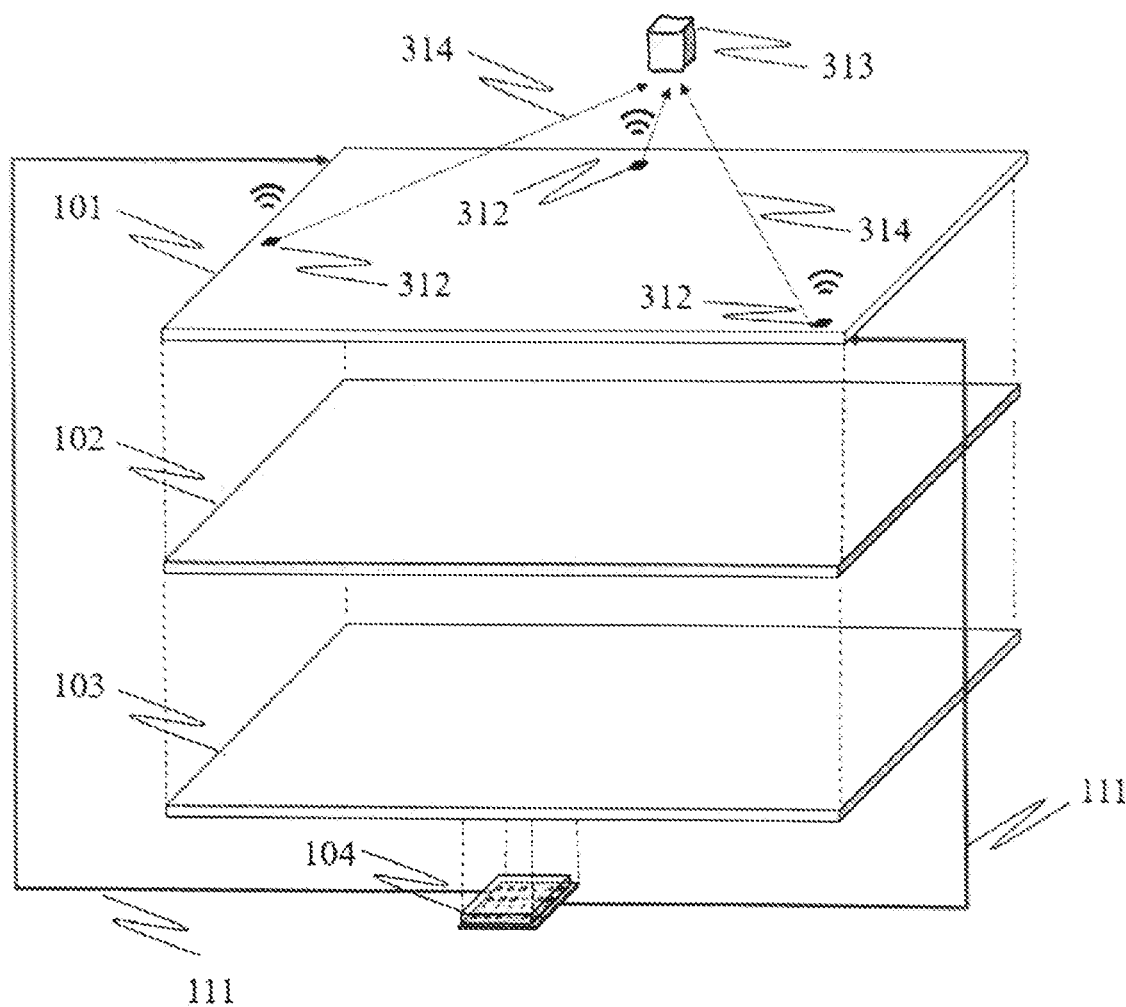
FIG. 3 shows, in a three-dimensional space, another embodiment of the multi-function ultrasonic sensor controller according to the invention with air-coupled ultrasonic transducers placed under the cover glass for movement recognition (inc. proximity sensing, gesture, respiration/breathing monitoring) and 3D positioning.

In the embodiment of the present invention shown in FIG. 3, the multi-function ultrasonic sensor controller (104) is connected (111) to one air-coupled ultrasonic transducer (312) placed under the cover glass (101) for movement recognition (inc. proximity sensing, gesture and respiration/breathing monitoring) through time-of-flight and velocity measurements of a nearby object (313) within field of view—ultrasonic generated waves (314) bouncing off obstacles in their path and detected back by the same piezoelectric membranes running in a microphone mode. Versus alternative ranging techniques (e.g. infrared), ultrasound presents several advantages such as insensitivity to ambient light, lower power consumption through the lower speed of sound/processing speed as well as the design of bezel-free devices with true-infinity display and accurate movement sensing. The addition of two extra air-coupled ultrasonic transducers (312), separated by enough distance to avoid geometric dilution of precision, further allows 3D positioning of nearby object (313) through trilateration calculation.

In a preferred embodiment of the present invention illustrated by FIG. 4a, ultrasonic transducers for fingerprint sensing (105), haptic feedback (213) and movement recognition/3D positioning (312) are jointly implemented and all connected (111) to the multi-function ultrasonic sensor controller (104)—the phased array of ultrasonic transducers used for fingerprint scanning (105) being centralised in one location.

Figure 4B:
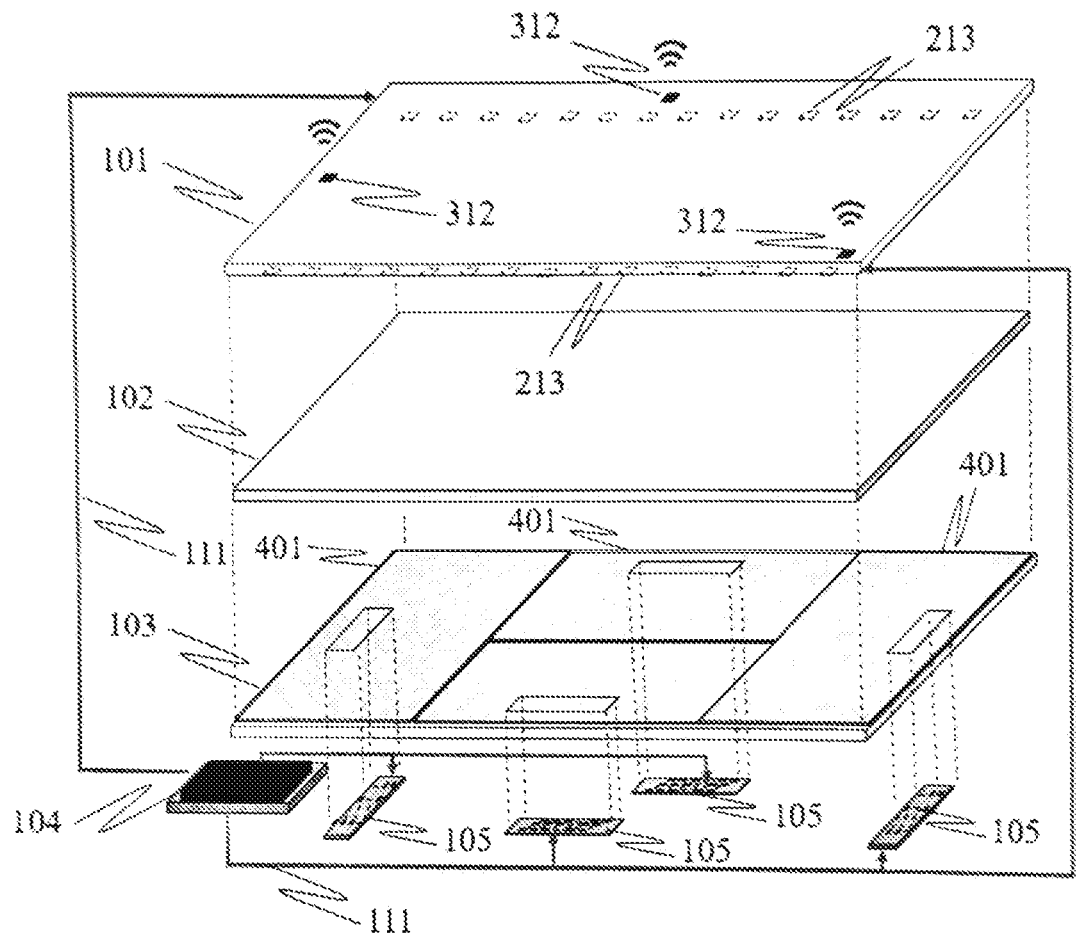
FIG. 4b illustrates, in a three-dimensional space, the joint implementation of ultrasonic transducers for fingerprint sensing, haptic feedback, movement recognition and 3D positioning all connected to the multi-function ultrasonic sensor controller according to the invention and where the phased array of ultrasonic transducers used for fingerprint scanning is spread out along the screen edges for more modularity in terms of covered display areas.

In an alternatively preferred embodiment of the present invention illustrated by FIG. 4b, ultrasonic transducers for fingerprint sensing (105), haptic feedback (213) and movement recognition/3D positioning (312) are jointly implemented and all connected (111) to the multi-function ultrasonic sensor controller (104)—the phased army of ultrasonic transducers used for fingerprint scanning (105) being spread out along the screen edges for more modularity in terms of covered display areas (401).

Although the multi-function ultrasonic sensor controller illustrated in FIGS. 4a and 4b respectively show the joint support for fingerprint sensing, haptic feedback and movement recognition/3D positioning, alternate embodiments may additionally support extra functionality. For instance, and according to non-illustrated embodiments of the present invention, the multi-function ultrasonic sensor may further include one additional ultrasonic transducer for the reception of remote power transfer through ultrasound waves. As such, numerous modifications and variations of the present invention are possible in light of the above teachings. It is therefore to be understood that within the scope of the appended claims, the invention may be practiced otherwise than as specifically described herein.

The invention claimed is:

1. A multi-function ultrasonic sensor controller comprising a set of ultrasonic transducers placed under a display panel of an end-user device for fingerprint scanning, and arranged in a linear configuration with each transducer pointing towards the display center of the end-user device in order to scan the end-user fingerprint from any location on the display.

2. The multi-function ultrasonic sensor controller, as recited in claim 1, wherein reflections captured by each transducer are first offset-compensated in order to emulate a circular configuration before being converted from polar to cartesian coordinates through inverse Fourier transform.

* * * * *